United States Patent [19]

Hirano

[11] Patent Number: 4,559,981
[45] Date of Patent: Dec. 24, 1985

[54] CONTROLLED CHUTE DEVICE

[75] Inventor: Takashi Hirano, Kobe, Japan

[73] Assignee: Yamato Scale Company, Limited, Japan

[21] Appl. No.: 495,763

[22] Filed: May 18, 1983

[30] Foreign Application Priority Data

May 20, 1982 [JP] Japan ............................. 57-74676[U]

[51] Int. Cl.⁴ .......................... G01G 19/22; B65B 1/34
[52] U.S. Cl. ........................................ 141/83; 141/94; 141/140; 177/25; 177/114
[58] Field of Search ................. 141/1, 94, 95, 83, 129, 141/140; 177/1, 25, 114; 222/65

[56] References Cited

U.S. PATENT DOCUMENTS

| | | | |
|---|---|---|---|
| 3,168,926 | 2/1965 | Dietert | 177/114 |
| 3,618,684 | 11/1971 | Burke et al. | 177/114 |
| 3,934,625 | 1/1976 | Tiernan et al. | 141/140 X |
| 3,939,928 | 2/1976 | Murakami et al. | 177/25 |
| 4,308,928 | 1/1982 | Oshima | 177/25 |
| 4,313,507 | 2/1982 | Hays | 177/25 |
| 4,344,492 | 8/1982 | Hirano | 177/25 |
| 4,398,614 | 8/1983 | Kahita et al. | 177/25 |
| 4,446,938 | 5/1984 | Kawanishi | 177/25 |
| 4,465,150 | 8/1984 | Matsumoto | 177/25 |

FOREIGN PATENT DOCUMENTS 1395322 5/1975 United Kingdom ................ 177/114

*Primary Examiner*—Stephen Marcus
*Assistant Examiner*—Ernest G. Cusick
*Attorney, Agent, or Firm*—Senniger, Powers, Leavitt and Roedel

[57] ABSTRACT

A controlled chute device, including a ramp chute having an entrance gate at the upstream and an exit gate at the downstream, for letting groups of product fed from the entrance gate slip down along it by gravity and discharging them from the exit gate, wherein the both entrance and exit gates are controlled sophisticatedly so that two or more groups of product sequentially fed from the entrance gate can exist on the chute at the same time without fear of contact and intermixture of the adjoining groups, which device is especially suitable for use in a combination weighing machine.

5 Claims, 3 Drawing Figures

CONTROLLED CHUTE DEVICE

SPECIFICATION

This invention relates to a controlled chute device, which is especially useful in a combination weighing machine. Although this device has been developed for use in the combination weighing machine, this invention should not be limited to this use. However, the following description will be made in conjunction with the combination weighing machine for the purpose of illustration only.

The device, which is generally referred to as "combination balance", "combination weighing device" or "combination weighing machine", is used for extracting a plurality of articles from a group of articles, such as candies, fruits or vegetables, having relatively large variances in the respective weights, to form a sub-group having a total weight which meets a predetermined requisite, for example, which falls within a predetermined range of weight. Typical examples of such device are disclosed in U.S. Pat. No. 3,939,928 and No. 4,267,894, wherein a plurality of articles are weighed individually by a plurality of weighing units or balances at the same time, all mathematical combinations of the measured weights are respectively summed and the resultant total weights are successively compared with a predetermined weight requisite. Thus, the combination providing a total weight which meets the requisite is selected for use.

U.S. patent application Ser. No. 268,696 filed June 1, 1981 by the same applicant discloses in its FIG. 1 a scheme of typical mechanical arrangement of an automatic combination weighing machine. In this machine, a plurality of weighing units, each having an automatically loaded and unloaded weighing cradle, are arranged circularly and a common funnel-type chute is disposed under the cradles so that the articles in those cradles belonging to the selected combination are discharged and collected therein. The collected articles are carried to a packing station by a belt conveyor passing under the exit gate of the collecting chute.

In the prior art combination weighing machines, the unloading gate of the each weighing cradle could not be opened before the precedently collected articles were discharged completely out of the chute, in order to prevent the succeedingly unloaded articles from mixing in the preceding ones. However, the time required by the articles for slipping down over the chute is relatively long as compared with the time required for the abovementioned combination selecting operation and it has been an essential factor of determining the working efficiency of the machine. This problem has become greater with increase in the number of weighing units incorporated in each machine, which has resulted in corresponding increase in the "size" or slanting distance of the chute.

The opened Japanese patent specification No. 57-116225 discloses one solution of this problem. In the combination weighing device of this citation, a collecting chute has an intermediate shutter in the middle of the slant thereof. This shutter is controlled to open and close in synchronism with the unloading gates of the weighing cradles and serves to stop the unloaded articles temporarily until the preceding articles are completely discharged out of the chute. However, this solution has not only complicated unwantedly the mechanical structure of the machine, but also introduced a new problem of damaging the articles by the shutter.

Accordingly, an object of this invention is to provide a novel and improved chute device which serves a same function as the above-cited device but has no additional mechanism such as shutter.

This object can be attained by the controlled chute device according to this invention, which comprises a slanting chute arranged to allow articles to slip down by gravity, a first gate control circuit for generating first gate control signals at predetermined period, and a first normally-closed gate disposed at the upstream end of said chute for responding to the first gate control signals to open to feed the articles to the chute. As a feature of this invention, the device further comprises inhibiting means actuated by said first gate control signals to inhibit generation of the first gate control signals during actuation, and releasing means for producing a releasing signal to stop the actuation of the inhibiting means when the articles pass a predetermined position on the slip-down path of the chute.

These and other objects and features of this invention will be described in more detail hereinunder with reference to the accompanying drawings.

Figure 1:
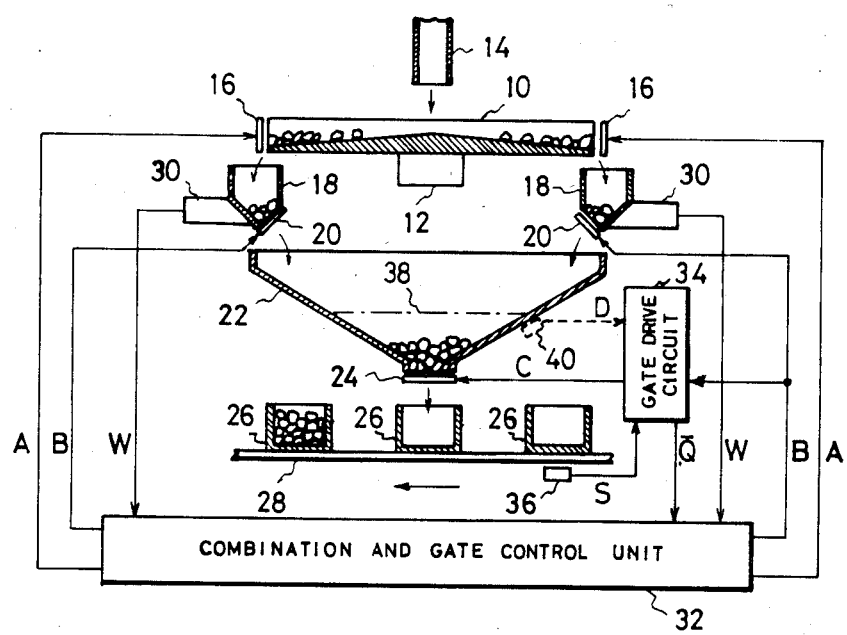
FIG. 1 is a schematic view representing a typical example of combination weighing machine employing the device of this invention.

Referring to FIG. 1, shown is a schematic view of a mechanical section of a typical automatic combination weighing machine in which this invention is embodied. The machine includes a vibration feeder 10 including a circular vibrating table having a peripheral wall, and a vibrator 12 for applying suitable vibration to the table so that articles supplied from a central chute 14 onto the table are shifted toward the peripheral wall. The peripheral wall of the feeder 10 has a plurality of exit ports having gates 16, respectively, which are normally closed and selectively opened under control of loading signals A from a combination and gate control unit 32, as described in the aforementioned U.S. patent application.

The machine also includes a plurality of weighing units arranged surrounding the feeder 10 so that their weighing cradles 18 are disposed respectively just under the exit gates 16 of the feeder 10, though only two of the weighing units are shown for simplification. The articles on the feeder 10 are fed into the each weighing cradle 18 when the corresponding gate 16 is opened. Each weighing cradle 18 has a bottom opening having a gate 20 which is normally closed and selectively opened under control of signals B from a combination and gate control unit or circuit 32, as also described in the above U.S. application. Each weighing unit also includes a weight sensor 30, such as load cell, which produces an electric signal W indicative of the weight of articles in the cradle 18 and supplies it to the combination and gate control unit 32. Under the gates 20, a common funnel-shaped collecting chute 22 is disposed for collecting the articles discharged from the selected weighing cradle 18. The chute 22 has a bottom opening having a gate 24 which is normally closed and periodically opened under control of delivery signals C from a gate drive circuit 34 according to this invention. Under the gate 24, a train of suitable containers 26, such as boxes or bags, are intermittently moved by a conveyor belt 28 which is driven by a suitable driving mechanism (not shown). When the gate 24 is opened, the collected articles are delivered into the each container 26 for packing.

In the prior art machines, in order to prevent the successive groups of articles from mixing on the chute 22, the gates are controlled such that the gates 20 are never opened before completion of delivery of the collected articles from the gate 24. Even in the improved prior art machine of the aforementioned opened Japanese patent specification No. 57-116225, a shutter is disposed in the midway position on the chute 22, as shown in phantom at 38, and controlled similarly so as to be opened after completion of delivery from the gate 24. As described hereinunder, a similar effect can be obtained without use of such a shutter, by the gate drive circuit 34 according to this invention.

Figure 2:
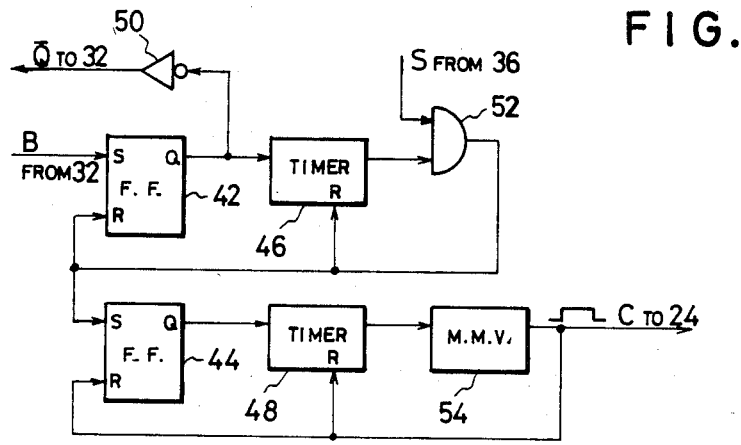
FIG. 2 is a block diagram representing an embodiment of the gate drive circuit in FIG. 1 according to this invention.

As shown in FIG. 2, an embodiment of the gate drive circuit 34 of this invention includes a pair of flip-flop circuits 42 and 44 and a pair of timer devices 46 and 48. The flip-flop 42 has a "set" input S coupled to receive the signal B from the combination and gate control unit 32. The combination and gate control unit 32 is arranged to prohibit delivery of the signal B when the signal $\bar{Q}$ from the gate drive circuit 34 is at LOW level, and all the gates are arranged to open and close in response to HIGH and LOW levels, respectively, of the control signals. The Q output of the flip-flop 42 is also coupled to the input of the timer 46.

The timer 46 is arranged to initiate counting of time in response to the Q signal of the flip-flop 42 and produce an output signal after a lapse of time which is equal to the time required by the articles discharged from the unloading gate 20 to reach the preset level 38 (see FIG. 1). The output of the timer 46 is coupled to one input of an AND circuit 52 the second input of which is coupled to receive the output signal S from a sensor 36. The sensor 36 may be of conventional optical, mechanical or electrical type and is arranged to sense the container 26 at the index position of the intermittent motion of the conveyor 28, which is just before the index position just under the gate 24, to provide the signal S. The output of the AND circuit 52 is coupled to "reset" input R of the flip-flop 42 and timer 46, and also to a "set" input S of the flip-flop 44 whose Q output is coupled to the input of the timer 48.

The timer 48 is arranged to initiate counting of time in response to the Q signal of the flip-flop 44 and produce an output signal after a lapse of time which is equal to the time required by the articles passing the level 38 to reach the gate 24 (FIG. 1). The output signal of the timer 48 is applied to a monostable multivibrator 54 arranged to produce a gate drive pulse C having a predetermined duration which is at least sufficient for delivering all the articles collected in the chute 22 from the gate 24. The pulse C is applied to the gate 24 to open it and also to "reset" inputs R of the flip-flop 44 and timer 48 to reset them.

Thus, from a functional standpoint, gates 20 may be referred to as loading gates (or loading gate means) for delivery of articles to the chute 22 for passage down the chute; unit 32 may be referred to as a loading gate control circuit adapted for generating successive loading gate control signals B, each loading gate 20 being responsive to successive control signals for the delivery of successive charges of articles to the chute 22 for passage down the chute; flip-flop 42 and inverter 50 may be referred to as inhibit means operable in response to a loading gate control signal B for inhibiting generation of succeeding signals B by unit 32; and timer 46 may be referred to as release means operable in response to the passage of a charge of articles past predetermined point 38 in the chute for producing a release signal to stop the inhibit operation of the flip-flop 42 thereby to allow the next control signal B to be generated by unit 32 for effecting delivery of the next charge of articles from the loading gate 20 to the chute for passage down the chute. Alternatively, timer 46 may be referred to as signal means for signaling the passage of a charge of articles past point 38 in the chute, and flip-flop 42 and inverter 50 may be referred to as means responsive to the timer 46 for effecting opening of gate 20. It will also be understood that the gate 24 at the lower (downstream) end of chute 24 may be referred to as an unloading gate (or unloading gate means), and that flip-flop 44, timer 48 and multivibrator 54 may be referred to as an unloading gate control circuit adapted for generating control signal C when a charge of articles reaches the lower end of the chute, the unloading gate 24 being responsive to signal C for opening to unload articles from the chute 22. Also, sensor 36 may be referred to as allowing means adapted to generate an allowing signal S as a container 26 comes into position below the lower end of chute 22, signal S being operable in conjunction with the release signal from timer 46 to allow another control signal B to be generated by unit 32 for effecting the delivery of the next charge of articles down chute 22. Assuming that, initially articles are present in the cradles 18 but not in the chute 22, one of the containers 26 is sensed by the sensor 36 and the flip-flops 42 and 44 are in reset state, HIGH level $\bar{Q}$ signal is applied to the combination and gate control unit 32 from the invertor 50 to allow the unit 32 to produce the unloading signal B.

When the signal B is produced in this condition and applied to the flip-flop 42, the invertor 50 provides a LOW level $\bar{Q}$ signal to the combination and gate control unit 32 to prohibit further production of the B signal. However, when the articles discharged from the selected cradles 18 in response to the signal B reach the level 38, the timer 46 provides a signal through the AND circuit 52 enabled by the signal S from the sensor 36, to the flip-flop 42 and timer 46 to reset them. Thus, the combination and gate control unit 32 becomes again possible to produce the signal B and, if the next signal B is produced, two groups of articles will slip or roll down at an interval on the chute 22 at the same time. As the output signal of the AND circuit 52 also drives the flip-flop 44 into set state, the timer 48 causes the multivibrator 54 to open the gate 24 when the first group of articles reach the gate 24 and about when the second group of articles are passing the level 38, thereby delivering the first group of articles into the container 26 which has been shifted to just under the gate 24 from the sensed position. It will be understood that the time interval between the adjoining containers 26 or the period of index motion of the conveyer 28 must be adjusted as substantially equal to the preset time of the timer 48 in order to complete the delivery operation of the chute 22.

If no container 26 is sensed by the sensor 36 when the first group of articles pass the level 38, the output signal of the timer 46 is blocked by the AND circuit 52 and the flip-flops 42 and 44 are left in set and reset states, respectively, Therefore, the second group of articles are not discharged from the cradles 18 and the first group of articles are detained on the gate 24.

If another container is sensed by the sensor 36, the output signal of the timer 46 passes the AND circuit 25 to reset and set the flip-flops 42 and 44, respectively. Accordingly, the second group of articles are discharged from the selected cradles 18 and the first group of articles detained on the gate 24 will be discharged about when the second group will reach the level 38, as in the above-described case.

Figure 3:
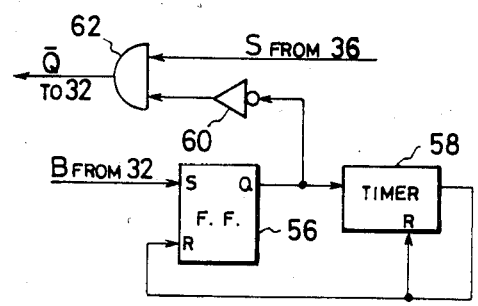
FIG. 3 is a block diagram representing another embodiment of the gate drive circuit of FIG. 1 according to this invention.

FIG. 3 shows another embodiment of the gate drive circuit according to this invention, which is used for a similar chute 22 having no gate 24, that is, the bottom opening of which is opened always. This arrangement includes a single flip-flop 56 and timer 58 which are initially reset. The flip-flop 56 has a "set" input coupled to receive the signal B from the combination and gate control unit 32 and a Q output coupled through an invertor 60 to one input of an AND circuit 62 whose second input is coupled to receive the signal S from the sensor 36. The output signal $\overline{Q}$ of the AND circuit 62 is applied to the combination and gate control unit 32 to prohibit production of the signal B when it is at LOW level. The timer 58 is preset the as same as the timer 46 of FIG. 2. It is understood that, every time a group of articles passes the level 38, the timer 58 resets the flip-flop 56 and, therefore, the next group of articles is discharged from the cradles 18 so long as the signal S exists to open the AND circuit 62.

Though, in the above embodiments, the signal S for the second input of the AND circuits 52 and 62 has been described as the output signal of the container sensor 36, it is not always limited thereto. The signal S may generally be such a signal as indicating a state in which the delivery of articles from the chute 22 should not cause any trouble. However, the most typical case where the signal S is requested occurs when the container 26 is out of its the normal regularly spaced position on the conveyer 28. Therefore, the signal S and, accordingly, the AND circuits 52 and 62 can be omitted when the containers 26 are fixed always to the conveyer 26 and no dropout should not occur.

The timers 46 and 58 produce output signals when the articles discharged from the cradles 18 pass the predetermined level 38. Therefore, they can be substituted with a sensor for sensing the articles passing the level 38, as shown by a dashed block 40 providing a signal D. Similar substitution can be made for the timer 48.

I claim:

1. A controlled chute device, comprising a chute sloped to permit articles to slide down the chute by gravity, loading gate means for delivery of articles to the chute for passage down the chute, a loading gate control circuit adapted for generating successive loading gate control signals, said loading gate means being responsive to said successive control signals for the delivery of successive charges of articles to the chute for passage down the chute, inhibit means operable in response to a loading gate control signal for inhibiting generation of succeeding loading gate control signals by said loading gate control circuit, and release means operable in response to the passage of a charge of articles past a predetermined point in the chute for producing a release signal to stop operation of said inhibit means thereby to allow the next control signal to be generated by said loading gate control circuit for effecting delivery of the next charge of articles from said loading gate means to the chute for passage down the chute.

2. The device, in accordance with claim 1, further comprising unloading gate means at one end of the chute consisting its downstream end, and an unloading gate control circuit adapted for generating an unloading gate control signal when a charge of articles reaches the downstream end of the chute, said unloading gate means being responsive to said unloading gate control signal for the unloading of said charge of articles from the chute.

3. The device, in accordance with claim 1, adapted for having a series of containers move under one end of the chute constituting its downstream end for the delivery of successive charges of articles from the chute into said containers, said device further comprising allowing means adapted to generate an allowing signal as a container comes into position below the downstream end of the chute, said allowing signal being operable in conjunction with said release signal to stop operation of said inhibit means thereby to allow a loading gate control signal to be generated by said loading gate control circuit for effecting delivery of the next charge of articles from said loading gate means to the chute for passage down the chute.

4. The device, in accordance with claims 1 or 3, wherein said release means comprises a timer device adapted to start in response to a loading gate control signal and to produce said release signal after a predetermined time.

5. The device, in accordance with claim 3, wherein said allowing means comprises a sensor responsive to a container coming into position below the downstream end of said chute for generating said allowing signal to control the delivery of a charge of articles from the chute to said container as it passes below the chute.

* * * * *